United States Patent [19]

Yoshimaru

[11] Patent Number: 4,984,227
[45] Date of Patent: Jan. 8, 1991

[54] OPTICAL DISC DEVICE

[75] Inventor: Tomohisa Yoshimaru, Yokohama, Japan

[73] Assignee: Kabushiki Kaisha Toshiba, Kawasaki, Japan

[21] Appl. No.: 325,052

[22] Filed: Mar. 16, 1989

Related U.S. Application Data

[63] Continuation of Ser. No. 230,722, Aug. 10, 1988, abandoned, which is a continuation of Ser. No. 9,584, Jan. 29, 1987, abandoned, which is a continuation of Ser. No. 704,466, Feb. 22, 1985, abandoned.

[30] Foreign Application Priority Data

Feb. 23, 1984 [JP] Japan .................. 59-32825

[51] Int. Cl.$^5$ .................. G11B 21/08; G11B 19/26
[52] U.S. Cl. .................. 369/32; 360/73.03; 369/50; 369/58; 369/59
[58] Field of Search .................. 369/32, 50, 41, 59, 369/54, 58; 360/73, 73.01, 73.03

[56] References Cited

U.S. PATENT DOCUMENTS

| | | | |
|---|---|---|---|
| 4,094,013 | 6/1978 | Hill et al. | 365/234 |
| 4,161,753 | 7/1979 | Bailey et al. | |
| 4,245,247 | 1/1981 | Fike et al. | 358/342 |
| 4,357,635 | 11/1982 | Hasegawa et al. | |
| 4,423,497 | 12/1983 | Sugiyama et al. | 358/342 X |
| 4,481,613 | 11/1984 | Yokota | 369/32 X |
| 4,514,771 | 4/1985 | Stark et al. | 360/73 |
| 4,530,018 | 7/1985 | Hoshino et al. | 360/73 |
| 4,530,083 | 7/1985 | Ishihara | 3690/41 X |
| 4,532,621 | 7/1985 | Nakagawa | 369/59 X |
| 4,550,347 | 10/1985 | Nakamuta | 369/50 X |
| 4,558,375 | 12/1985 | Sontheimer | 369/50 X |
| 4,641,294 | 2/1987 | Yoshimaru | 369/50 X |

FOREIGN PATENT DOCUMENTS

| | | |
|---|---|---|
| 0080256 | 1/1983 | European Pat. Off. |
| 0072704 | 2/1983 | European Pat. Off. |
| 0079669 | 5/1983 | European Pat. Off. |
| 0796695 | 5/1983 | European Pat. Off. |
| 271282 | 11/1977 | Fed. Rep. of Germany |
| 58-175142 | 10/1983 | Japan .................. 369/59 |

OTHER PUBLICATIONS

Matsushita–Pat. Abst. of Japan, vol. 8, No. 48, Mar. 1984, p. 258.
Mitsubishi–Pat. Abst. of Japan, vol. 7, No. 90, Apr. 1983, p. 191.

Primary Examiner—Aristotelis M. Psitos
Assistant Examiner—W. R. Young
Attorney, Agent, or Firm—Cushman, Darby & Cushman

[57] ABSTRACT

An optical disc device includes a disc drive unit for driving an optical disc to rotate at a constant rotating speed, and an optical head for recording and reproducing data to and from the optical disc. A recording or a reproducing timing is determined according to the access position data for setting a recording position or a reproducing position on the optical disc. At the recording or reproducing timing as determined, data is recorded or reproduced at a constant linear density.

4 Claims, 5 Drawing Sheets

F I G. 5
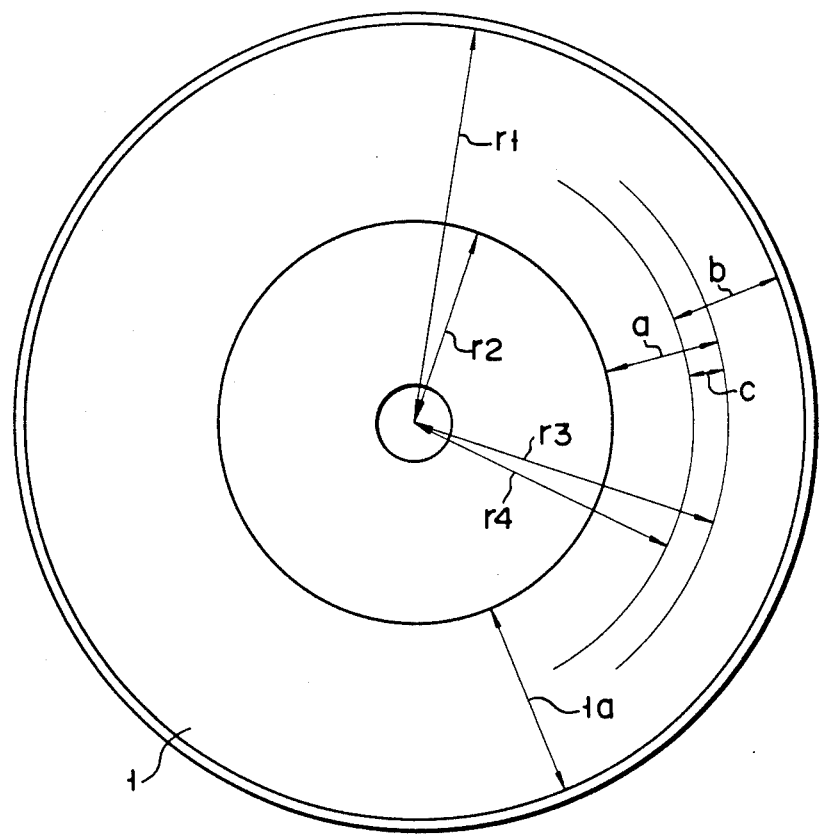

OPTICAL DISC DEVICE

This is a continuation of application Ser. No. 07/230,722, filed Aug. 10, 1988, now abandoned; which is an FWC of Ser. No. 07/009,584 filed Jan. 29, 1987, now abandoned; which is an FWC of Ser. No. 06/704,466 filed Feb. 22, 1985, now abandoned.

BACKGROUND OF THE INVENTION

The present invention relates to an optical disc device and, more particularly, to an optical disc device for writing and reading data to and from an optical disc at a constant linear velocity.

A so-called image filing system as a business machine for recording and reproducing document data has been widely used. As known, in this system, image data is optically read out of an image bearing document, and the read out image data is recorded into the recording medium. In use, the image data as once recorded is read out from the recording medium, and reproduced by a display unit for visual presentation or a printer for hard copy.

The optical disc device employs an optical disc for recording image data. The optical disc spirally records the image data on the surface. For recording or reading out the image data, an optical head, set close to the optical disc, is driven by a linear motor to rectilinearly move in the radial direction of the optical disc.

Two systems for the record/read out of the image data have been known; one is a so-called constant linear velocity (CLV system), and the other is a so-called constant angular velocity (CAV system) In the CLV system, in order that the track on the optical disc moves at a constant speed relative to the optical head as moved thereto, the optical disc is rotated at such a rotating speed as is slower as the optical head moves from the inner side, i.e., the center portion, to the outer side, i.e., the peripheral portion of the optical disc. In the CAV system, the rotating speed of the optical disc is set at a constant value for stabilizing the record/read out operation and reducing an access time.

In the CLV system, for recording and reading out image data, the rotating speed of the optical disc is changed with a position of the optical head on the radial path above the optical disc. Therefore, it takes a long time until the rotating speed is settled down at a constant value. In this respect, the CLV system has a limit in increasing the rotating speed. Thus, the CLV system requires a long access time and a slow data transfer speed.

The CAV system inevitably rejects a high density record of data.

SUMMARY OF THE INVENTION

Accordingly, an object of the present invention is to provide an optical disc device which can obtain the reduction of the access time, and increase of the memory capacity and data transfer speed, at a constant rotating speed of the optical disc.

According to the present invention, there is provided an optical disc device comprising a detector for detecting a recording or reproducing radial position on an optical disc, means for determining a timing of recording or reproducing data according to the recording or reproducing position, and means for recording or reproducing data at the recording or reproducing timing while the optical disc is rotating at a constant speed.

BRIEF DESCRIPTION OF THE DRAWINGS

FIG. 5 shows a plan view of an optical disc used for the optical disc device shown in FIG. 4.

DETAILED DESCRIPTION OF THE PREFERRED EMBODIMENTS

Figure 1:
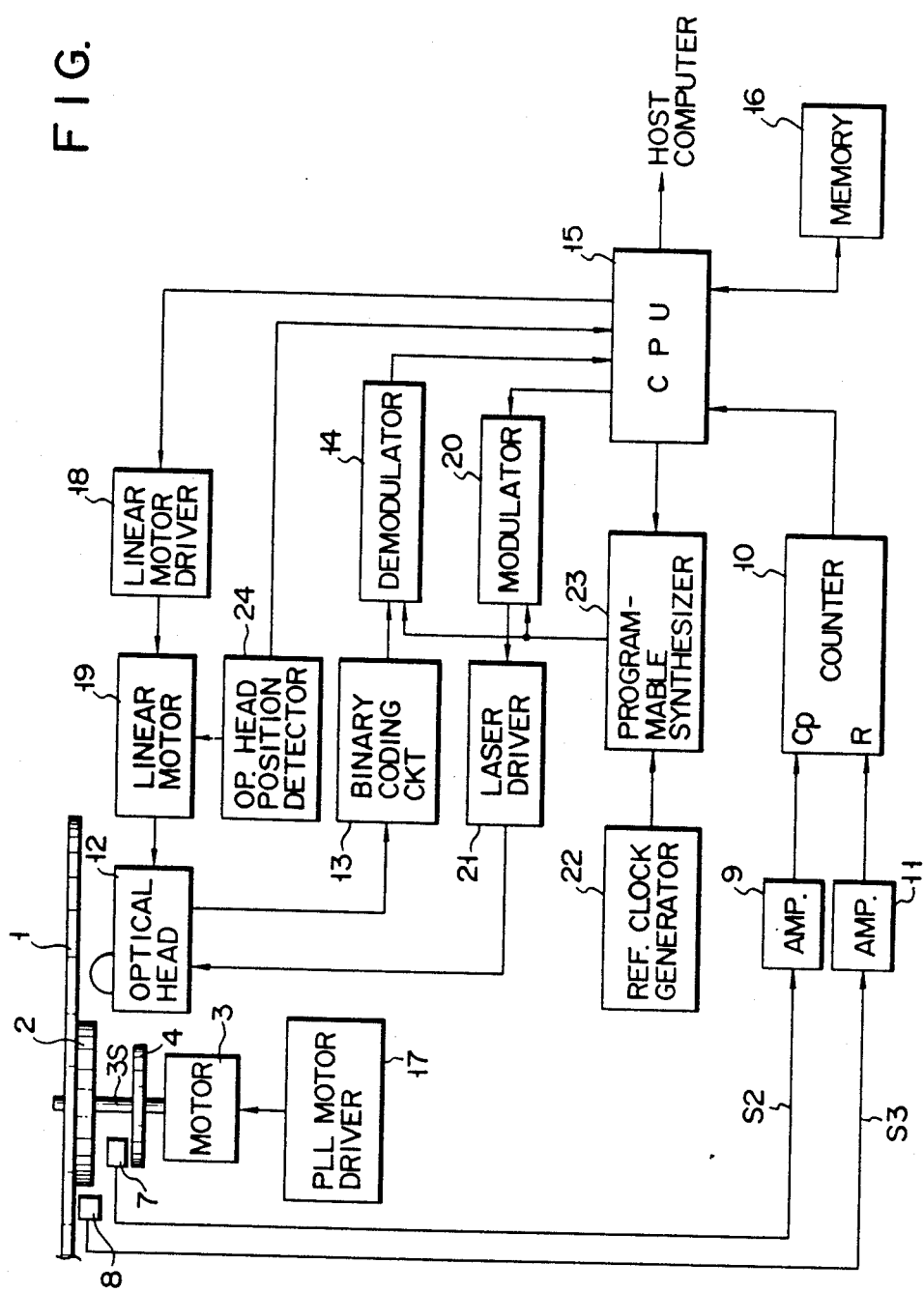
FIG. 1 is a block diagram of an optical disc device which is an embodiment of the present invention.
Figure 2:
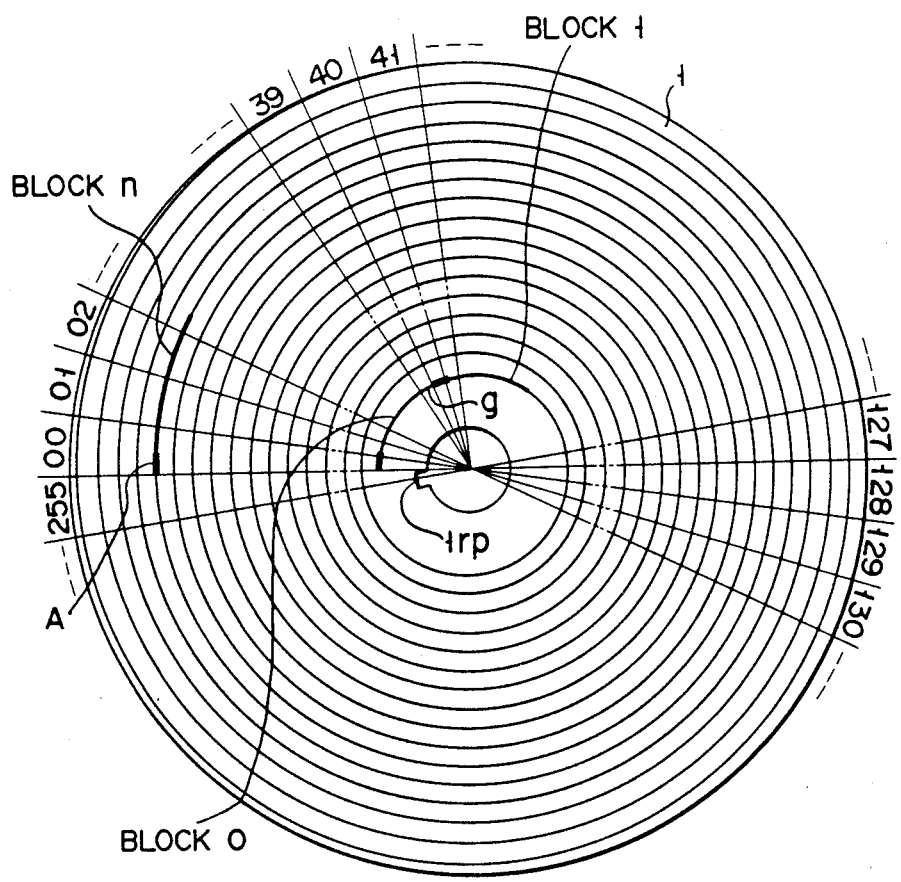
FIG. 2 shows a plan view of an optical disc used for the optical disc device shown in FIG. 1.

An optical disc device shown in FIG. 1 employs an optical disc 1 as a recording medium. The optical disc 1, as shown in FIG. 2, is composed of a disc plate made of glass or plastic and a metal film made of tellurium bismuth, for example, with which the surface of the disc plate is coated in a doughnut fashion. The optical disc 1 is provided with a reference position mark lrp as a cutaway formed near the center of the metal film. The surface of the optical disc 1 is divided into 256 sectors, 0 to 255 sectors. These sectors are successively numbered clockwise on the disc, with the number 0 for the reference position mark lrp. A groove is helically formed on a record area on the optical disc 1 from the inner side to the outer side. The helical groove is segmented into 36,000 tracks, each track being one turn of the groove on the disc. These 36,000 tracks are successively numbered from the 0th to the 36,000th.

The 36,000 tracks are segmented into 300,000 blocks, for example. Each block has a plurality of sectors. In each block, the number of sectors of the inner side track is different from that of the outer side track, in order to secure the record of a constant amount of data at a constant recording density. The innermost track has 40 sectors, and the outermost track has 20 sectors. In case one track fails to exactly terminate at the boundary between the sectors, for a given amount of data, a block gap g is provided between the data end of the sector and the next sector. For example, the 0th block terminates preceding to the first sector (No. 40) in the first block, a block gap g is provided in the final sector (No. 39) of the 0th block. Thus, each block of the optical disc 1 is so designed at the starting end of the sector. A block header A, including a block number, a track number, and the like, is recorded in the head of each block. The block header A is recorded, for example, when data is recorded into a disc.

Figure 3:
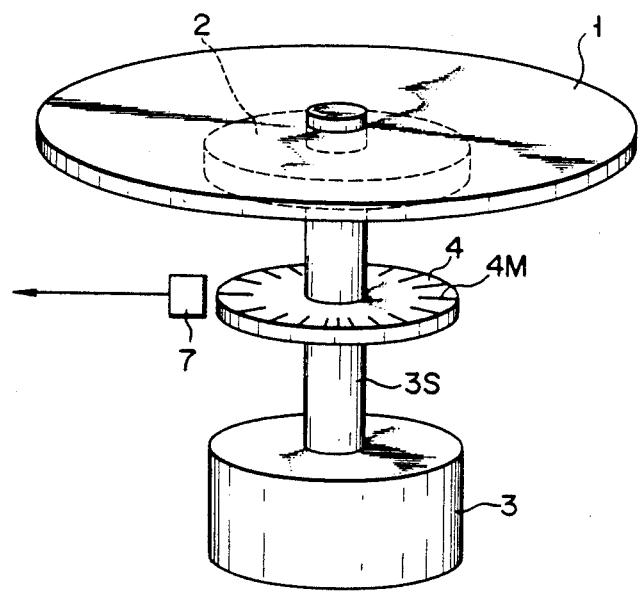
FIG. 3 shows a perspective view of an optical disc drive mechanism.

The optical disc 1 is set on a turn table 2 which is coupled with a shaft 3S of a motor 3. A clock disc 4 is further mounted to the shaft 3S, as shown in FIG. 3. Sector markers 4M are marked on the outer periphery portion of the clock disc 4 at constant intervals, corresponding to the sectors (No. 00 to No. 255) on the optical disc 1. Specifically, the sector markers 4M are provided closer to the outer peripheral edge of the clock disc 4, and optically detected by a sector marker detector 7 constructed with a photo interrupter. The sector marker detector 7 is connected at the output terminal to an amplifier 9.

A reference mark detector 8 for detecting a reference position mark lrp of the optical disc 1 is disposed under the optical disc 1. The reference mark detector 8 is constructed with a photo interrupter, like the sector marker detector 7, and its output terminal is connected to an amplifier 11. The detectors 7 and 8 through respective amplifiers 9 and 11 are connected to a sector counter 10. The counter 10 responds to a sector mark signal S1 and a sector mark signal S2 respectively derived from the detectors 7 and 8, and counts the number of sectors. The counter 10 counts up every time it receives the sector mark signal S2, and inputs its count to a CPU 15. The counter 10 is reset by a reference position signal S3.

Under the optical disc 1, an optical head 12 is disposed closer to and facing the underside of the optical disc 1. The optical head 12 is mounted to a carrier of a linear motor 19. The linear motor 19 is connected to a motor driver 18. When the linear motor 19 is driven by the motor driver 18, the optical head 12 is radially moved along the optical disc 1.

The optical head 12 includes a semiconductor laser, a collimating lens for collimating a laser beam emitted by the laser, a splitter for splitting the laser beam emanating from the collimating lens, a λ/4 plate, an objective, a voice coil for driving the objective, and a photo sensor for converting the beam reflected from the optical disc 1 into a corresponding electrical signal.

The output terminal of the optical head 12 is connected to the CPU 15, through a binary coding circuit 13 and a demodulator 14. The CPU 15 is provided for controlling the overall operation of the disc device, and is connected to a host computer (not shown) and a memory 16. The host computer is provided for controlling the input and output of image data, and inputs desired block number data to the CPU 15. The memory 16 stores the data table as shown in the following table.

TABLE

| Clock rate data | Number of sector | Start sector number | First block number | First track number |
|---|---|---|---|---|
| 1 | 40 | 00 | 000000 | 0 |
| 2 | 39 | 15 | 002459 | 384 |
| 3 | 38 | 40 | 005210 | 804 |
| • | • | • | • | • |
| • | • | • | • | • |
| • | • | • | • | • |
| • | • | • | • | • |
|  | 20 |  | 300000 |  |

Upon receipt of the block number data from the host computer, the CPU 15 computes a track number and a start sector number, both belonging to the input block number data, in connection with the data in the data table stored in the memory 16.

The CPU 15 is further connected to a programmable synthesizer 23. The programmable synthesizer 23 is constructed with a frequency variable type frequency dividing circuit. Functionally, the programmable synthesizer 23 frequency divides the output signal from a reference clock generator 22 according to the data from the CPU 15. The output terminal of the programmable synthesizer 23 is connected to the demodulator 14 and a modulator 20. The input terminal of the modulator 20 is connected to the CPU 15 for receiving the record data. The output terminal of the modulator 20 is connected to the optical head 12, through the laser driver 21.

In the above disc device, if the CPU 15 receives the data of the block number "10", for example, from the host computer, the counter 10 decides that the block number "10" belongs to a group of block numbers 0 to 2458. Then, the first block number of the block number group is retrieved from the data table in the memory 16. Since the first block number is "0", a start sector number "00" and the number of sectors "40" are read out from the memory location of an address corresponding to the block number "0". A track number and a sector number, which correspond to the input block number, are calculated using the start sector number "00" and the number of sectors "40", and the block number "10". This calculation is performed by $$Tn = \{(IB - BB) \times NS + SS)\} \div 256$$

where IB : input block number, SB : the first block number, NS : the number of sectors, and SS : start sector.

When the above equation is calculated, the quotient (Tn) is a presumptive track number, and the remainder is the sector number. An actual track number TN is given by $$TN = Tn + Tns$$

where Tns is a track number corresponding to the first block number.

As a result of the above calculation, the track number is 1 and the start sector number of a set block "10" is 144.

The CPU 15 reads out from the memory 16 the clock rate data "1" corresponding to the start sector number "00" of the first block, and works out frequency dividing factor data using the clock rate data. In this case, the clock rate data "1" is subtracted from a constant "190". The result of the subtraction is used as a denominator for the calculation of the frequency dividing factor. The constant "190" is determined by an appropriate peripheral speed of the disc. The frequency dividing factor (1/189) data as calculated is input to the programmable synthesizer 23. The programmable synthesizer 23 frequency divides a clock signal (20 MHz) from the reference clock generator 22 according to the frequency dividing factor (1/189) of the frequency dividing factor data, and supplies its output pulse to the modulator 20 and the demodulator 14.

The track number "1" thus calculated is converted, by the CPU 15, into a scale value representing a position of the optical head. When the scale value is applied to the motor driver 18, the linear motor 19 is so driven as to move the optical head 12 to the track number "1". A position of the optical head 12 is detected by the position detector 24, and the optical head 12 is moved in the radial direction of the optical disc 1 until the detected position reaches the scale value. The position detector 24 may be a position detector as disclosed in U.S. Pat. No. 4,481,613.

The counter 10 counts the number of sectors in response to the output signals of the detectors 7 and 8. When the count of the counter 10 reaches the start sector number 144, the recording of data into the optical disc 1 starts. At this time, in the modulator 20, the record data from the CPU 15 is modulated by a clock signal 20 MHz/189 from the programmable synthesizer 23. The modulated signal is then applied to the laser driver 21. The laser driver 21 drives the semiconductor laser of the optical head 12 in accordance with the modulated data. As a result, data is recorded into the optical disc 1 by the laser beam emitted from the semiconductor laser.

Then, if the block number 2500 is selected, the calculation similar to that in the case of the block number 10 is performed. Specifically, $Tn = \{(2500 - 2459) \times 39 + 15\} \div 256$
$= 6$ and remainder of 78

$TN = 6 + 63 = 69$

Thus, the track number is 69 and the start sector number is 78. According to the data, the optical head 12 is positioned above the block number 2500. From this position, the recording operation starts. The modulating signal at this time follows. The clock rate data is 2. Then, the frequency dividing factor is 188 and the modulating frequency is 20 MHz/188. The record data is modulated by the clock signal at 20 MHz/188 derived from the programmable synthesizer 23. Thus, as the track number is larger, viz., the writing position shifts to the outer periphery of the disc, the clock frequency increases proportional to the peripheral speed of the disc. As a result, data is recorded at a substantially constant linear speed.

For reproducing data, a block number for the data to be reproduced is input by the host computer Then, the CPU 15 calculates a track of the desired block number, the starting sector, and the clock rate data, as in the case of the data recording. For example, if the desired block number is 10, the track number is 1, and the starting sector number of the set block "10" is 144. When the block corresponding to the track number 10 and the starting sector number 144 of the set block "10" is retrieved, data is reproduced from this block 10. At this time, the reproduced data is demodulated by the clock signal at 20 MHz/189, and is sent through the CPU 15 to the host computer, and then displayed or printed out.

When another block is designated, a similar operation is repeated to reproduce the data in the designated block.

Figure 4:
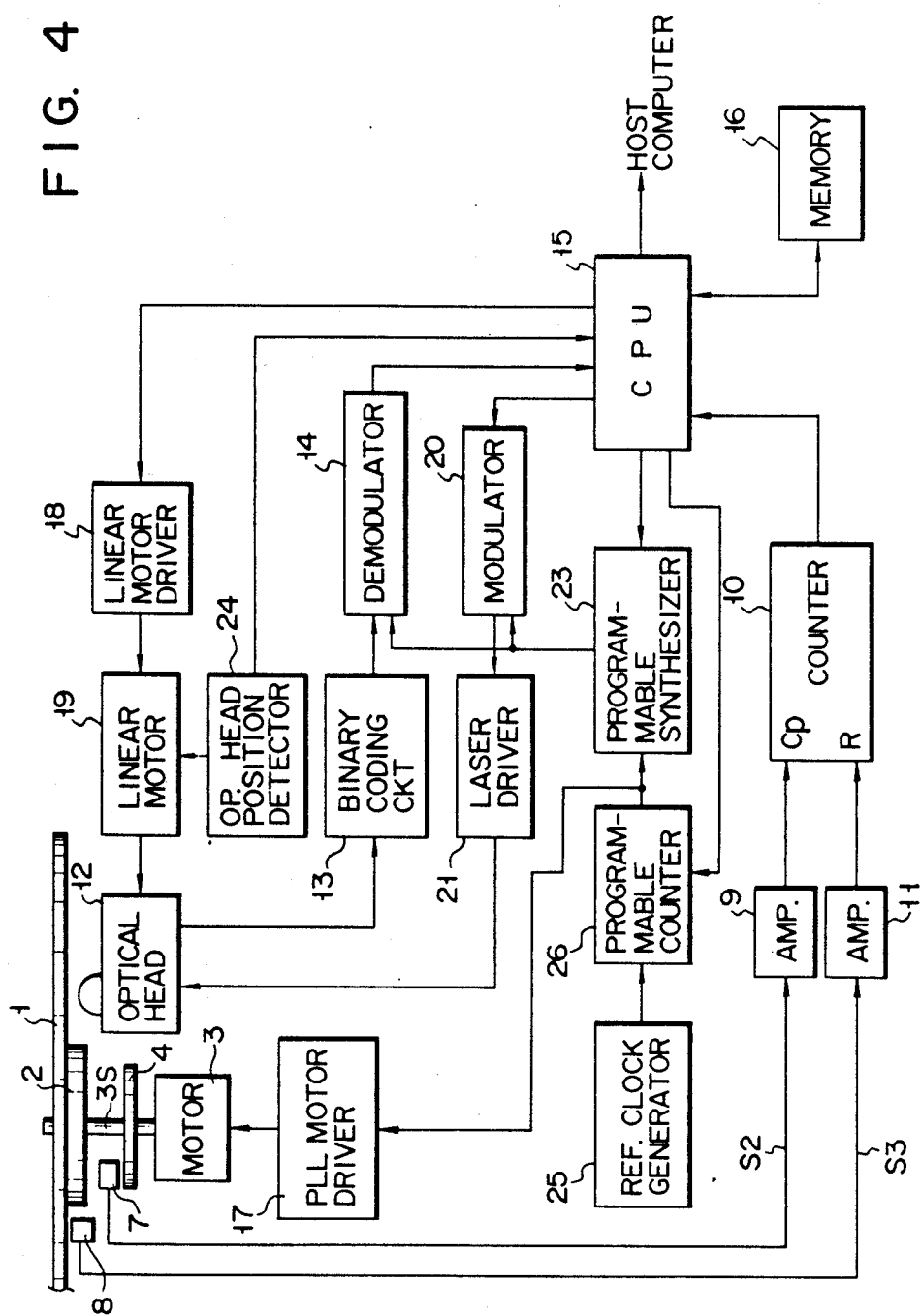
FIG. 4 is a block diagram of an optical disc device which is another embodiment of the present invention.

While in the above-mentioned embodiment, the rotating speed of the optical disc is perfectly made constant, an embodiment of the invention to follow changes the rotating speed of the optical disc at two steps for data record/reproduction. In this embodiment, as shown in FIG. 4, a reference clock generator 25 is connected to a programmable counter 26. The programmable counter 26 is constructed with a binary/ternary counter in which either of the binary mode and the ternary mode is selected in response to a signal from the CPU 15. The output signal from the programmable counter 26 is connected to the PLL motor driver 17 and the programmable synthesizer 23.

The switching of the operation mode of the programmable counter 26 between the binary mode and the ternary modo is for switching the rotating speed of the optical disc, i.e., at two steps, one for 900 rpm and the other for 600 rpm. The rotating speeds are appropriately selected according to the inner area and the outer area on the disc. Specifically, as shown in FIG. 5, a data recording area 1a on the optical disc ranges from a circle distanced 72.5 mm (=r2) from the center of the disc to another circle distanced 145 mm (=r1) from the center. 900 rpm is assigned to a recording area a on the disc, which is within a circle distanced 109 mm (=r3) from the center, and has a width of 36.5 mm. 600 rmp is assigned to a recording area b which is outside a circle distanced 97 mm (=r4) from the center and has a width of 48 mm. In a recording area c ranging over a width of 48 mm where the recording areas a and b overlap, 900 rpm is employed when its recording area is continuously accessed from the disc center. 600 rpm is employed when it is continuously accessed from the outermost peripheral side of the disc.

In FIG. 4, the reference clock generator 25 generates a clock pulse signal at 18 MHz which in turn is applied to the programmable counter 26. Upon receipt of the clock signal, the programmable counter 26 counts the clock pulses in the binary mode or the ternary mode. For example, if data is recorded or reproduced to or from the recording area a, the programmable counter 26 is set in the binary mode by the signal from the CPU 15. Therefore, the programmable counter 26 converts the clock signal at 18 MHz into a pulse signal at 9 MHz, and supplies it to the PLL motor driver 17 and the programmable synthesizer 23. The PLL motor driver 17 rotates the turn table 2 at 900 rpm by the 9 MHz pulse signal as received. The programmable synthesizer 23 converts the 9 MHz pulse signal into a modulating or demodulating clock signal in a similar way to that of the first embodiment. For reproducing the data, a block number of the data to be reproduced is input from the host computer. Then, the CPU 15 computes a track of the desired block, the start sector, and the clocking rate data. If the desired block number is 10, the track number is 1, and the start sector number of the set block "10" is 144. If the block corresponding to the track number 1 and the start sector number 144 of the set block "10" are retrieved, data is reproduced from this block 10. At this time, the reproduced data is demodulating by a clock signal 9 MHz/189, and is sent through the CPU 15 to the host computer, and then is displayed or printed out.

When the block number 2500, for example, is selected, the calculation similar to that in the case of the block number 10 is executed to obtain a track number 69 and a start sector number 78. According to the data thus obtained, the optical head 12 is positioned above the block number 2500. The reproducing operation starts from this position. The demodulated signal at this time follows. Since the clock rate data is 2, the frequency dividing factor is 188. Accordingly, the modulating frequency is 9 MHz/188, and the record data is modulated by the clock signal at 9 MHz/188 from the programmable synthesizer 23. Thus, as the track number is larger, viz. the reproducing position shifts to the outer peripheral side of the optical disc, the clock frequency increases proportional to the peripheral speed of the disc. As a result, the data is recorded at a constant linear velocity.

When the data is continuously reproduced from the disc in this way, and the optical head 12 runs beyond the recording area a, the CPU 15 issues a signal to designate the recording area to the programmable counter 26. By this signal, the programmable counter 26 is set in the ternary mode, and produces a pulse at 6 MHz. When the 6 MHz signal is supplied to the PLL motor driver 17, the turn table 2 rotates at 600 rpm. In turn, the frequency of the output signal from the programmable synthesizer 23 changes. Specifically, the pulse signal frequency is 6 MHz/frequency dividing factor and is lower than that in the case of the recording area a. Therefore, if the reproducing area is switched to the recording area b, the data reproduction is performed at the same record density as that in the data reproduction in the recording area a.

When the optical head 12 moves, for data reproduction, from the outer side recording area b to the inner side recording area a, through the overlap area c, the motor rotating speed is changed from 600 rpm to 900 rpm, and the pulse signal frequency for demodulation changes from 6 MHz/frequency dividing factor to 9 MHz/frequency dividing factor.

As described above, in the second embodiment, the recording area on the optical disc is divided into two areas, and the disc rotating speed is changed at two steps. With such an arrangement, the frequency range of the circuit to make modulation or demodulation so as to make the linear velocity constant in recording or reproducing data can be narrowed. The result is that such circuit operation is stabilized.

As seen from the foregoing description, in the present invention, the recording or reproducing timing is successively changed according to a recording or reproducing position, while the rotating speed is set at a constant value. The access time is reduced, and data is uniformly and entirely recorded on the disc, resulting in increase of the recording capacity of the disc.

What is claimed is:

1. An optical disk device for recording data on and reproducing data from an optical disc, comprising:
   a motor for rotating the optical disk, the optical disk having an inner recording area and an outer recording area which overlap to each other and having a number of continuous blocks provided along a helical groove and divided into a plurality of block groups each having a predetermined number of blocks, the blocks each having a constant length;
   a reference clock generator for generating clock pulses;
   a programmable counter connected to said reference clock generator, for counting the clock pulses in one of a binary mode and a ternary mode and for selectively outputting first and second output signals corresponding respectively to the binary mode and the ternary mode, the first output signal having a first frequency, the second output signal having a second frequency, the binary mode being for accessing the inner recording area, and the ternary mode being for accessing the outer recording area;
   a motor driver connected to said motor and said programmable counter for driving said motor, in response to a selective one of the first and second output signals, to make the optical disk rotate at a corresponding one of a first rotating speed and a second rotating speed;
   block designating means for selectively designating a block to be recorded and a block to be reproduced;
   control means connected to said block designating means and said programmable counter for determining a clock frequency required for recording data on and reproducing data from the designated block, said control means including means for storing a plurality of different clock-rate parameters corresponding respectively to the block groups, means for reading out from among the clock-rate parameters one clock-rate parameter which corresponds to the designated block, and means for calculating the clock frequency from the clock-parameter readout and the first and second output signals and outputting a clock signal having the clock frequency determined for every block group;
   modulating/demodulating means for selectively modulating and demodulating the data so that the data corresponding to the blocks included in the block group corresponding to the designated block are modulated and demodulated by the clock signal; and
   means for recording the data, modulated by said modulating/demodulating means, on the optical disc.

2. The optical disc device according to claim 1, wherein said motor driver drives said motor so as to make the optical disc selectively rotate at 900 rpm, corresponding to the first rotating speed, and 600 rpm, corresponding to the second rotating speed.

3. The optical disc device according to claim 1, wherein said programmable counter selectively outputs first and second output signals at 6 MHz and 9 MHz, respectively.

4. The optical disc device according to claim 1, wherein said control means includes a memory for storing the different clock-rate parameters, and a CPU connected to said memory for reading out from among the clock-rate parameters one clock-rate parameter, and a programmable synthesizer connected to said CPU, for calculating the clock frequency from the clock-parameter and one of the first and second output signals.

* * * * *